(12) United States Patent
Du

(10) Patent No.: US 11,080,883 B2
(45) Date of Patent: Aug. 3, 2021

(54) IMAGE RECOGNITION DEVICE AND METHOD FOR RECOGNIZING IMAGES

(71) Applicant: HONGFUJIN PRECISION ELECTRONICS (TIANJIN) CO., LTD., Tianjin (CN)

(72) Inventor: Cheng-Han Du, New Taipei (TW)

(73) Assignee: HONGFUJIN PRECISION ELECTRONICS (TIANJIN) CO., LTD., Tianjin (CN)

(*) Notice: Subject to any disclaimer, the term of this patent is extended or adjusted under 35 U.S.C. 154(b) by 135 days.

(21) Appl. No.: 16/509,601

(22) Filed: Jul. 12, 2019

(65) Prior Publication Data
US 2020/0334847 A1    Oct. 22, 2020

(30) Foreign Application Priority Data

Apr. 22, 2019  (CN) .......................... 201910324818.1

(51) Int. Cl.
*G06T 7/70* (2017.01)
*G06K 9/00* (2006.01)
*G06T 7/00* (2017.01)

(52) U.S. Cl.
CPC ............ *G06T 7/70* (2017.01); *G06K 9/00711* (2013.01); *G06T 7/97* (2017.01); *G06T 2207/10016* (2013.01)

(58) Field of Classification Search
None
See application file for complete search history.

(56) References Cited

U.S. PATENT DOCUMENTS

| 10,877,485 | B1* | 12/2020 | Martin ................. G05D 1/0088 |
| 2016/0205341 | A1* | 7/2016 | Hollander .............. H04N 7/015 |
| | | | 375/240.08 |
| 2019/0034734 | A1* | 1/2019 | Yen ......................... G06T 7/246 |
| 2019/0034735 | A1* | 1/2019 | Cuban ........................ G06T 7/70 |
| 2019/0073520 | A1* | 3/2019 | Ayyar ...................... G06K 9/42 |
| 2019/0122082 | A1* | 4/2019 | Cuban ............. H04N 21/25883 |
| 2019/0213420 | A1* | 7/2019 | Karyodisa .......... G06K 9/00288 |
| 2020/0120360 | A1* | 4/2020 | Rassool ................. H04N 19/30 |

FOREIGN PATENT DOCUMENTS

CN    105264879    1/2016

* cited by examiner

*Primary Examiner* — Fayyaz Alam
(74) *Attorney, Agent, or Firm* — ScienBiziP, P.C.

(57) ABSTRACT

A method for detecting and recognizing objects in images includes obtaining a video stream and pre-processing the video stream to obtain an image queue arranged in a frame playing order and storing the image queue into a storage device. An image frame of the image queue from the storage device is read and at least one object in the image frame is detected and recognized. An image recognition device is also provided.

11 Claims, 3 Drawing Sheets

IMAGE RECOGNITION DEVICE AND METHOD FOR RECOGNIZING IMAGES

FIELD

The subject matter herein generally relates to imaging recognition.

BACKGROUND

A video frame rate of a 4K (or 8K) video playing device can be 30 FPS, or higher. When one or more object detections are required for each video frame, the image recognition workload is large and the recognition speed is required to be fast. Current image recognition systems are not fast enough for real-time object detection.

Thus, there is a room for improvement.

BRIEF DESCRIPTION OF THE DRAWINGS

Implementations of the present disclosure will now be described, by way of embodiments, with reference to the attached figures.

DETAILED DESCRIPTION

Figure 1:
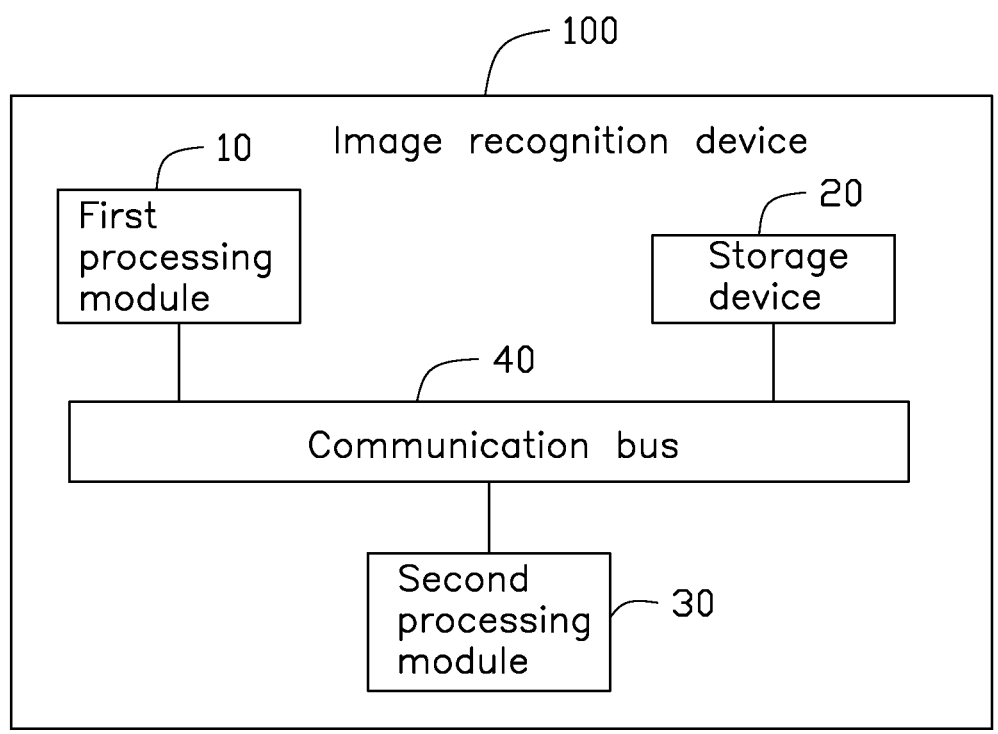
FIG. 1 is a diagram of an image recognition device in an operating environment in one embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure. It should be noted that references to "an" or "one" embodiment in this disclosure are not necessarily to the same embodiment, and such references mean "at least one".

Several definitions that apply throughout this disclosure will now be presented.

The connection can be such that the objects are permanently connected or releasably connected. The term "comprising," when utilized, means "including, but not necessarily limited to"; it specifically indicates open-ended inclusion or membership in the so-described combination, group, series, and the like.

FIG. 1 illustrates an image recognition device 100 for recognizing at least one object in an image in accordance with an embodiment. The image recognition device 100 can comprise a first processing module 10, a storage device 20, a second processing module 30, and a communication bus 40. The first processing module 10, the storage device 20, and the second processing module 30 can communicate with each other through the communication bus 40.

In one embodiment, the storage device 20 can be inside the image recognition device 100, or can be a separate external memory card, such as an SM card (Smart Media Card), an SD card (Secure Digital Card), or the like. The storage device 10 can include various types of non-transitory computer-readable storage mediums. For example, the storage device 10 can be an internal storage system, such as a flash memory, a random access memory (RAM) for temporary storage of information, and/or a read-only memory (ROM) for permanent storage of information. The storage device 10 can also be an external storage system, such as a hard disk, a storage card, or a data storage medium. The communication bus 40 can comprise data buses, power buses, and control buses.

The first processing module 10 can obtain a video stream and pre-process the video stream to obtain an image queue arranged in a frame playing order.

In one embodiment, the first processing module 10 can obtain the video stream from a video recording device, a video playing device, or a data storage device. The data storage device can be the storage device 10, thus, the first processing module 10 can obtain the video stream from the storage device 20. The pre-processing can comprise decoding the video stream and segmenting the video stream into a plurality of image frames.

In one embodiment, the processing module 10 can pre-process the video stream to obtain an image queue arranged in a frame playing order. The starting image frame of the image queue can be the first frame image of the video stream, and the end image frame of the image queue can be the last frame image of the video stream.

In one embodiment, the processing module 10 further stores the image queue in the storage device 10. The processing module 10 can comprise one or more processors, the processor can be a central processing unit (CPU), a microprocessor, an application specific integrated circuit (ASIC), a field programmable gate array (FPGA), or a complex programmable logic device (CPLD). When the processing module 10 comprise multiple processors, the processing module 10 can pre-process the video stream using multiple threads.

The second processor 30 is configured to read an image frame of the image queue from the storage device 20 and recognize the image frame to detect at least one object in the image frame.

In one embodiment, the second processor 30 can comprise at least one image recognition model. The second processor 30 can recognize the image frame to detect the at least one object using the at least one image recognition model. The image recognition model can be a recognition model trained by a machine learning algorithm, such as a depth residual network algorithm, or a convolutional neural network algorithm, etc.

In one embodiment, the object recognized by the second processor 30 can be defined according to actual use requirements of the image recognition device 100. For example, the object can be a person, a container, or a handbag. When the second processor 30 need to identify multiple types of objects, each type of object may correspond to one image recognition model.

For example, the second processor 30 comprises a first image recognition model and a second image recognition model. The first image recognition model is configured for recognizing persons in the image frame, and the second image recognition model is configured for recognizing containers in the image frame. Thus, the second processing module 30 can realize detection of persons and of containers in the image frame.

In one embodiment, the image frame read by the second processing module 30 can be a frame of the image queue that is not being recognized.

In one embodiment, the second processing module 30 can repeatedly read the image frame one by one in sequence according to a frame order of the image queue. That is, the image frames ranked in the top of the image queue are preferentially read and recognized by the second processing module 30.

In one embodiment, when the second processing module 30 reads the image frame of the image queue from the storage device 20, the second processing module 30 further adjusts image parameters of the image frame and recognizes the adjusted image frame to detect the at least one object. The image parameters can comprise a pixel parameter and/or a brightness parameter. For example, the second processing module 30 can reduce pixels of the image frame to improve a recognition speed of the image frame.

In one embodiment, the second processing module 30 can recognize the image frame to obtain information as to category of the at least one object and save the category information as a label of the at least one object into the image frame. For example, when the second processing module 30 recognizes that an object is a person, the category information of the object can be "person". When the second processing module 30 recognizes that an object is a handbag, the category information of the object can be "container".

Figure 2:
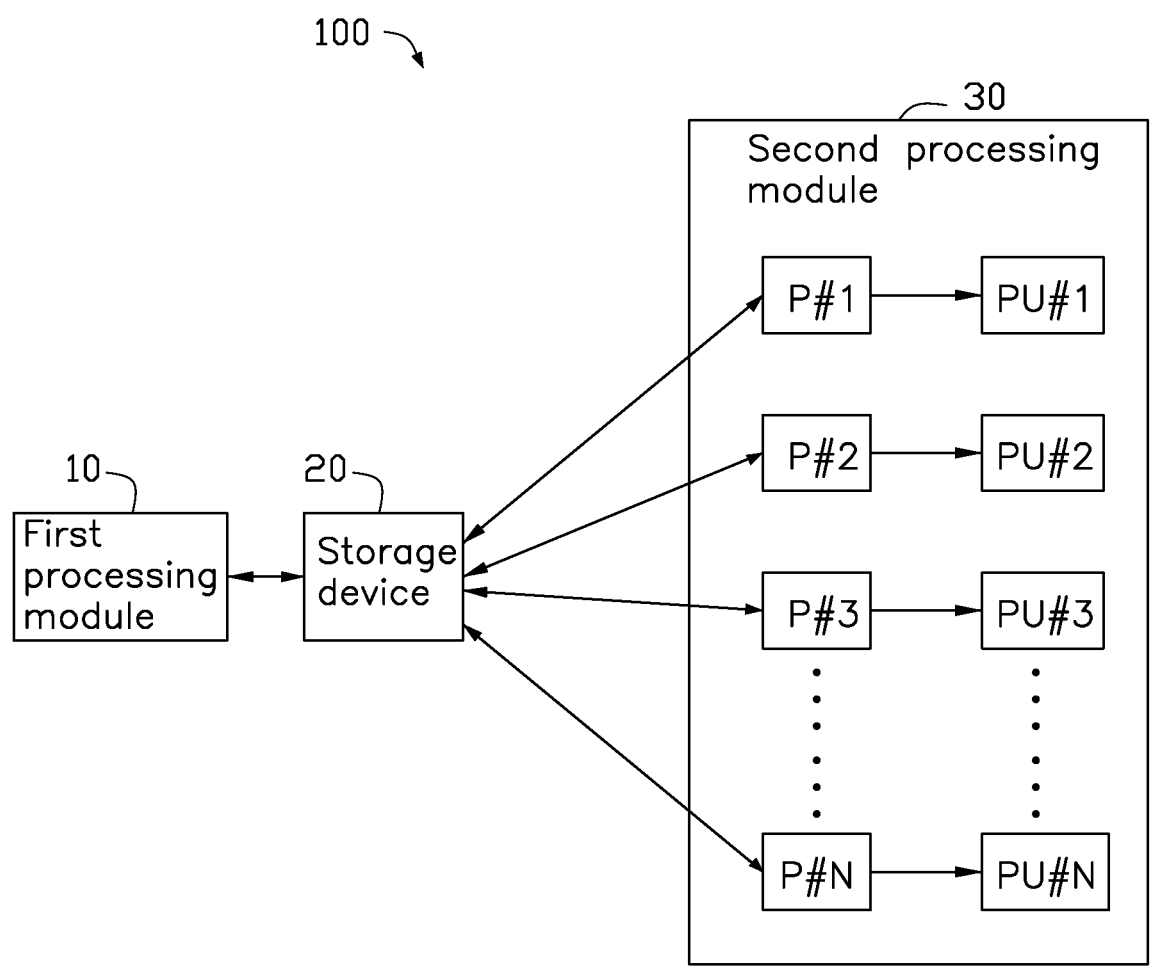
FIG. 2 is a block diagram of an embodiment of the image recognition device of FIG. 1.

Referring to FIG. 2, the second processing module 30 can be a processor clustering, and the second processing module 30 supports hardware extension to improve data processing capability. The second processing module 30 can comprise a plurality of threads P#1, P#2, . . . , P#N (P#1~P#N) and a plurality of processing units PU#1, PU#2, . . . , PU#N (PU#1~PU#N). N can be a natural number that is greater than 1. Each of the plurality of threads P#1~P#N corresponds to one of the plurality of processing units PU#1~PU#N. For example, the thread P#1 reads an image frame of the image queue from the storage device 20 and transmits the image frame to the processing unit PU#1 to detect the at least one object.

In one embodiment, each of the plurality of processing units PU#1~PU#N can comprise at least one image recognition model. The second processing module 30 has a good recognition speed by the plurality of threads P#1~P#N and the plurality of processor units PU#1~PU#N, to realize real-time object detection with regard to ultra-high-definition (UHD) image frames.

In one embodiment, when the thread P#1 reads a UHD image frame from the storage device 20, the thread P#1 transmits the UHD image frame to the processing unit PU#1 to detect the at least one object. In order to avoid having to read large amount of data, leading to low image recognition speed, the thread P#1 reads the next UHD image frame after the processing unit PU#1 has recognized the current UHD image frame.

In one embodiment, when the storage device 20 stores unrecognized image frames, the plurality of processing units PU#1~PU#N can read the image frame in parallel. For example, the second processing module 30 comprises eight threads P#1~P#8 and eight processing units PU#1~PU#8. The thread P#1 reads a first image frame of the image queue and transmits same to the processing units PU#1, the thread P#2 reads a second image frame of the image queue and transmits same to the processing units PU#2, and the thread P#8 reads an eighth image frame of the image queue and transmits same to the processing units PU#8. When the processing unit PU#1 has recognized the first image frame of the image queue, the thread P#1 reads a ninth image frame of the image queue and transmits same to the processing unit PU#1.

In one embodiment, each of the processor units PU#1~PU#N can be a CPU, a microprocessor, an ASIC, a FPGA, or a CPLD.

Figure 3:
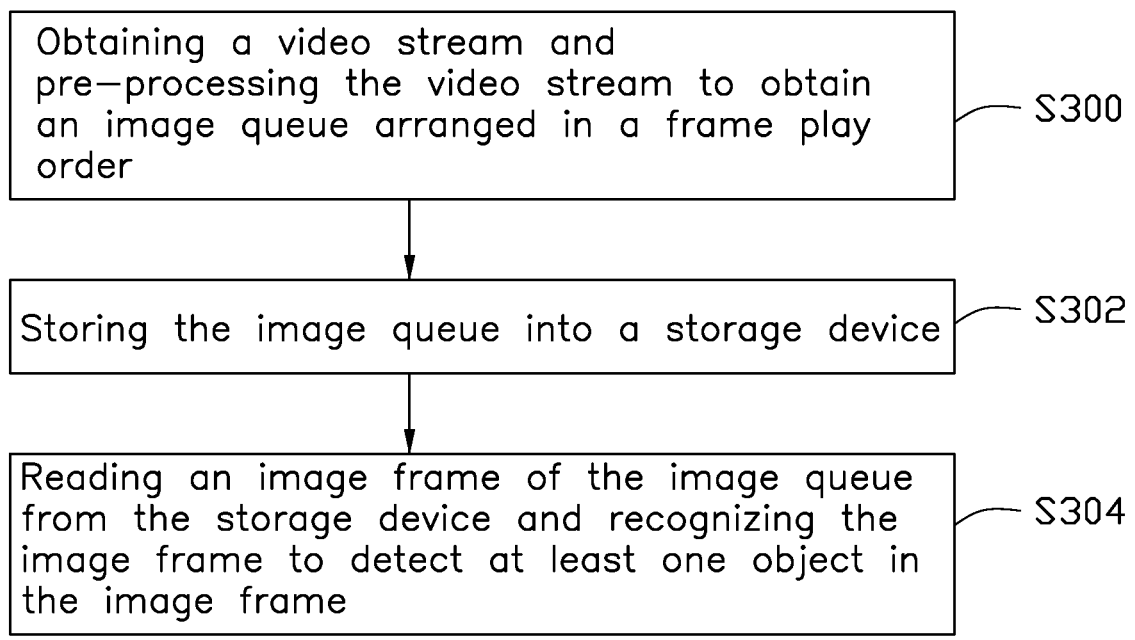
FIG. 3 is a flow diagram of a method for recognizing an image in one embodiment.

FIG. 3 illustrates one exemplary embodiment of an image recognition method. The flowchart presents an exemplary embodiment of the method. The exemplary method is provided by way of example, as there are a variety of ways to carry out the method. The method described below can be carried out using the configurations illustrated in FIG. 1, for example, and various elements of these figures are referenced in explaining the example method. Each block shown in FIG. 3 may represent one or more processes, methods, or subroutines, carried out in the example method. Furthermore, the illustrated order of blocks is illustrative only and the order of the blocks can change. Additional blocks can be added or fewer blocks may be utilized, without departing from this disclosure. The example method can begin at block 300.

In block 300, obtaining a video stream and pre-processing the video stream to obtain an image queue arranged in a frame playing order by the first processing module 10.

In block 302, storing the image queue into the storage device 20 by the first processing module 10.

In block 304, reading an image frame of the image queue from the storage device 20 and recognizing the image frame to detect at least one object in the image frame by the second processing module 30.

The embodiments shown and described above are only examples. Many details known in the field are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. An image recognition method operable in an image recognition device, the image recognition device comprising a first processing module, a second processing module, and a storage device, the image recognition method comprising:
    obtaining a video stream and pre-processing the video stream to obtain an image queue arranged in a frame playing order, by the first processing module;
    storing the image queue into the storage device, by the first processing module; and
    reading an image frame of the image queue from the storage device and recognizing the image frame to detect at least one object in the image frame, by the second processing module;
    wherein the second processing module reads the image frame one by one in sequence according to a frame order of the image queue, the second processing module comprises a plurality of threads and a plurality of processing units, each of the plurality of threads corresponds to one of the plurality of processing units, the method of reading the image frame of the image queue from the storage device and recognizing the image frame to detect the at least one object in the image frame by the second processing module comprises:

controlling the thread to read one image frame of the image queue from the storage device and transmitting the image frame to the corresponding processing unit; and recognizing the image frame to detect the at least one object in the image frame, by the corresponding processing unit.

2. The image recognition method of claim 1, wherein the method of obtaining the video stream by the first processing module comprises:

obtaining the video stream from the storage device, by the first processing module.

3. The image recognition method of claim 1, wherein each of the plurality of processing units comprises one or more image recognition models, each of the image recognition models is configured to recognize a type of object.

4. The image recognition method of claim 1, wherein the block method of recognizing the image frame to detect the at least one object in the image frame by the second processing module comprises:

recognizing the image frame to obtain category information of the at least one object, by the second processing module; and saving the category information as a label of the at least one object into the image frame.

5. The image recognition method of claim 1, wherein the method of recognizing the image frame to detect the at least one object by the second processing module:

adjusting image parameters of the image frame and recognizing an adjusted image frame to detect the at least one object, by the second processing module;

wherein the image parameters comprise a pixel parameter and a brightness parameter.

6. An image recognition device comprising:
a storage device;
a first processing module obtaining a video stream and pre-processing the video stream to obtain an image queue arranged in a frame playing order;
the first processing module further storing the image queue into the storage device; and
a second processing module reading an image frame of the image queue from the storage device and recognizing the image frame to detect at least one object in the image frame;
wherein the second processing module reads the image frame one by one in sequence according to a frame order of the image queue, the second processing module comprises a plurality of threads and a plurality of processing units, each of the plurality of threads corresponds to one of the plurality of processing units, each of the plurality of threads is configured to read one image frame of the image queue from the storage device and transmit the image frame to the corresponding processing unit to detect the at least one object.

7. The image recognition device of claim 6, wherein the first processing module obtains the video stream from the storage device.

8. The image recognition device of claim 6, wherein each of the plurality of processing units comprises one or more image recognition models, each of the image recognition models is configured to recognize a type of object.

9. The image recognition device of claim 6, wherein the second processing module recognizes the image frame to obtain category information of the at least one object and saves the category information as a label of the at least one object into the image frame.

10. The image recognition device of claim 6, wherein the second processing module further adjusts image parameters of the image frame and recognizes an adjusted image frame to detect the at least one object.

11. The image recognition device of claim 6, wherein the image parameters comprise a pixel parameter and a brightness parameter.

* * * * *